United States Patent
Balbierer et al.

(10) Patent No.: US 10,701,156 B2
(45) Date of Patent: Jun. 30, 2020

(54) METHOD FOR TRANSMITTING DATA BETWEEN NODES OF A MOTOR VEHICLE USING AN ETHERNET-AVB TRANSPORT PROTOCOL AND CONTROL UNIT CONFIGURED TO CARRY OUT SAID METHOD

(71) Applicant: CONTINENTAL AUTOMOTIVE GMBH, Hannover (DE)

(72) Inventors: Norbert Balbierer, Kelheim (DE); Josef Nöbauer, Neukirchen-Balbini (DE); Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/400,480

(22) PCT Filed: May 8, 2013

(86) PCT No.: PCT/EP2013/059630
§ 371 (c)(1),
(2) Date: Nov. 11, 2014

(87) PCT Pub. No.: WO2013/167679
PCT Pub. Date: Nov. 14, 2013

(65) Prior Publication Data
US 2015/0131681 A1 May 14, 2015

(30) Foreign Application Priority Data

May 11, 2012 (DE) .................. 10 2012 207 883

(51) Int. Cl.
*H04L 29/08* (2006.01)
*H04L 12/40* (2006.01)
(Continued)

(52) U.S. Cl.
CPC .............. *H04L 67/12* (2013.01); *H04L 12/12* (2013.01); *H04L 12/407* (2013.01);
(Continued)

(58) Field of Classification Search
None
See application file for complete search history.

(56) References Cited

U.S. PATENT DOCUMENTS 9,225,496 B2    12/2015   Diab et al.
2001/0029197 A1*  10/2001  Hulyalkar ......... H04W 52/0219
                                                   455/574
(Continued)

FOREIGN PATENT DOCUMENTS

CN         101409661        4/2009

OTHER PUBLICATIONS

IEEE 802.1BA, "Audio Video Bridging (AVB) Systems", Published Sep. 30, 2011.*

(Continued)

*Primary Examiner* — James P Duffy
(74) *Attorney, Agent, or Firm* — Cozen O'Connor

(57) ABSTRACT

A method for transmitting data using an Ethernet AVB transport protocol between nodes of a motor vehicle includes: reserving resources necessary for the transmission of the data by reservation messages from a dedicated protocol; setting flow of data from a node to a particular transmission rate and/or data rate; transmitting data at cyclic intervals via an Ethernet-based network by inputting the data into a transmission frame and forwarding to local transmitters; deactivating the local transmitters and receivers of a node in non-use periods, in which no data need to be transmitted; activating again the local transmitters and receivers of a node provided that data are pending transmission in a transmission frame, wherein the local transmitters (Continued)

and receivers are available for transmission following an activation time; and activating the local transmitters and/or receivers of the nodes based on a reservation message and a setting of the transmission rate and/or data rate.

7 Claims, 2 Drawing Sheets

(51) Int. Cl.
    *H04L 12/407*     (2006.01)
    *H04L 12/12*     (2006.01)
    *H04L 12/815*     (2013.01)
    *H04L 29/06*     (2006.01)

(52) U.S. Cl.
    CPC .... *H04L 12/4013* (2013.01); *H04L 12/40039* (2013.01); *H04L 47/22* (2013.01); *H04L 65/1003* (2013.01); *H04L 69/323* (2013.01); *Y02D 50/40* (2018.01); *Y02D 50/42* (2018.01)

(56) References Cited

U.S. PATENT DOCUMENTS

| | | | |
|---|---|---|---|
| 2009/0158360 A1* | 6/2009 | Diab | H04L 12/40 725/75 |
| 2010/0110952 A1 | 5/2010 | Diab | |
| 2011/0022699 A1* | 1/2011 | Powell | G06F 1/3209 709/224 |
| 2012/0288279 A1* | 11/2012 | Zhang | H04B 10/272 398/66 |
| 2013/0007762 A1* | 1/2013 | Krishnamurthy | G06F 9/5044 718/104 |

OTHER PUBLICATIONS

IEEE 802.1Qat, "Virtual Bridged Local Area Networks, Amendment 14: Stream Reservation Protocol (SRP)", Published Sep. 30, 2010.*
Office Action dated Nov. 7, 2016 which issued in the corresponding Chinese Patent Application No. 201380024567.6. (English translation included).

* cited by examiner

METHOD FOR TRANSMITTING DATA BETWEEN NODES OF A MOTOR VEHICLE USING AN ETHERNET-AVB TRANSPORT PROTOCOL AND CONTROL UNIT CONFIGURED TO CARRY OUT SAID METHOD

CROSS-REFERENCE TO RELATED APPLICATIONS

This is a U.S. national stage of application No. PCT/EP2013/059630, filed on 8 May 2013, which claims priority to the German Application No. DE 10 2012 207 883.5 filed 11 May 2012, the content of both incorporated herein by reference.

BACKGROUND OF THE INVENTION

1. Field of the Invention

The invention relates to a method for transmitting data using an Ethernet AVB transport protocol between nodes of a motor vehicle that, in particular, may at least to some extent also be in the form of controllers of the motor vehicle. The transmission of data by the Ethernet AVB transport protocol has provision for data to be transmitted at cyclic intervals via an Ethernet-based network by inputting the data into a transmission frame, also called an MAC frame, and forwarding them to local transmitters of a node of the motor vehicle. The AVB transport protocol has provision for, prior to the data being sent, the resources that are necessary for the transmission of the data, particularly the data rate and the transmission rate, to be reserved by reservation messages from a dedicated (separate) protocol, particularly what is known as the MSRP (Multiple Stream Reservation Protocol), wherein the flow of data from a node, particularly in the case of reservation by what is known as traffic shaping, is set to a particular transmission rate and/or data rate.

The method has provision for the local transmitters and receivers of a node, which are also called PHY devices and particularly accomplish the bit-by-bit data transmission in the physical layer, to be deactivated in non-use periods, in which no data need to be transmitted, and activated again provided that data are pending transmission in a transmission frame (MAC frame) from an upstream layer, particularly what is known as the MAC layer, wherein the local transmitters and receivers (PHY devices) are available for transmission following an activation time.

2. Related Art

Besides the typical bus systems in the automotive field, such as CAN bus, FlexRay or the like, the bus system operating on the basis of an Ethernet transport protocol is also increasingly finding its way into the motor vehicle. The Ethernet, i.e., a network that operates on the basis of the Ethernet transport protocol, and is usually wired, has a high data rate, is highly flexible and has worldwide standardization. Therefore, the Ethernet will also be an important system interface for a motor vehicle in the coming years.

The increasing electrification of motor vehicles also means an increasing rise in the power requirement thereof. This in turn results in increased fuel consumption, which has a direct effect on the end user in terms of cost. In addition, taxation on a motor vehicle today is calculated on the basis of $CO_2$ (carbon dioxide) emissions, which can in turn be derived from the energy consumption in terms of fuel. The range of an electrically operated vehicle is also coupled to the capacity of the battery and hence to the power requirement of the loads connected in the motor vehicle.

During standard network operation, the local transmitters and receivers (PHY devices), which are also called Ethernet transceivers, have a constant power requirement that is independent of the utilization level of the connection in the data transmission, since what are known as IDLE code groups are sent when no useful data need to be transmitted via the data connection.

A new IEEE 802.3az standard (also called energy efficient Ethernet—EEE) provides expansions in order to deactivate the transmission of IDLE code groups in the local transmitters and the receivers on the other side of the communication connections during the periods without useful data transmission instead of continuing to send the IDLE code groups. This deactivation is also called Low Power Idle—LPI (energy saving mode). This allows the power requirement to be reduced in the physical layer, which produces the actual data transmission.

The aforementioned standard also stipulates the minimum transmission time between the normal state of the Ethernet transceiver, in which data transmission can take place, and the deactivated mode (LPI). In this case, the time for waking or activating a transmitter and/or receiver from the energy saving mode (LPI) is specified at 30 µs. This time is called the waking or activation time $T_w$. In addition, a changeover time is stipulated that is needed in order to transfer the local transmitter and/or receiver to an energy saving mode (LPI state). This deactivation time $T_s$ is 200 µs according to the provided standard. The activation time $T_w$ and the deactivation time $T_s$ are the minimum values according to the standard and cannot be reduced, in order to remain compliant with the standard. Compliance with the standard is necessary in order to achieve a universal communication capability among the devices.

In order to save energy from an Ethernet AVB connection (Ethernet Audio Video Bridging), US 2011/0090914 A1 proposes a method in which an energy-efficient network (EEN—Energy Efficient Networking) is negotiated. In this case, the MAC controllers and the PHY transceivers negotiate a data rate for the connection, with a lower data rate reducing the power consumed by the transceivers. In order to maintain the connection and to avoid complex tuning of the PHY transceivers among one another (training), time windows of the Ethernet AVB connection are regularly used in order to update configuration parameters and/or training information. The disadvantage in this case, however, is that the data rate needs to be known beforehand in order to afford an appropriate setting option.

EP 2 073 464 A1 discloses a method in which the PHY transceivers transmit data on different data channels. When the data packet traffic is relinquished, some channels can be shut down or reset to an idle mode with relatively low energy consumption, the proposal being made that one or more of the quiet channels be used for transmitting control signals.

In an Ethernet network, the transceivers (Ethernet transceivers, PHY devices) in a first protocol layer (PHY layer), also called physical layer, allow the actual communication between connected network subscribers by physically sending and receiving the data packets. The connection control is performed in a second protocol layer (MAC layer, media access control layer, which is upstream of the first protocol layer), also called data link layer, by MAC controllers. The MAC controllers of the second protocol layer form transmission frames (MAC frames), in which the actual data are then compiled on a bit-by-bit basis and transmitted to the actual data transmission to the PHY layer. Data transmission takes place only when a transmission frame (MAC frame) in the second protocol layer is pending transmission. In order to maintain the data connection, IDLE packets or IDLE code groups are sent when there are no data pending transmission. The actual applications, for example in controllers, are then found in protocol layers further upstream of the second protocol layer.

The Ethernet AVB transport protocol IEEE 1722 is increasingly becoming of interest in use in motor vehicles. This protocol sends data via an Ethernet-based network at cyclic intervals. Before the actual sending of the data, the required resources, for example the data rate and/or the transmission rate from the local transmitter to the local receiver, are reserved.

In particular, this is performed for the dedicated MSRP protocol (Multiple Stream Reservation Protocol), which is part of the AVB standard 802.1Qat. This propagates the transmission cycle, inter alia. Typical transmission rates are 125 μs, which is significantly shorter than the minimum transmission cycle comprising activation time $T_w$ and deactivation time $T_s$.

Traffic shaping is a further function of the Ethernet AVB standard which is implemented by the Q802.3Qav standard. Traffic shaping affords the opportunity to control the flow of data from a node of the network, with a particular transmission rate and/or data rate being set. The basic idea of traffic shaping is to delay data packets arriving too quickly from the upper protocol layers in order to initiate uniform transmission to the physical transmission devices of the physical layer. This reservation message and the parameters contained therein set and adjust the traffic shaper of the respective output ports.

Since the typical transmission rate is higher than the minimum transmission cycle comprising activation time $T_w$ and deactivation time $T_s$ in this mode, however, it is not possible to save any power or any energy in this mode. Instead, the data packets are merely delayed. The realtime response of the Ethernet AVB standard is thus adversely affected by the energy efficient Ethernet EEE. The underlying problem is the activation time $T_w$ that is always needed when leaving the deactivated state of the local transmitters and/or receivers in order to activate the local transmitters and receivers. According to the proposed standard, a local transmitter and/or receiver leaves the deactivated state only when a transmission frame (MAC frame) in which data are intended to be transmitted is available. Since the upper (upstream) layers of the data transmission protocol (communication model) are largely decoupled from the physical data transmission, it is thus always possible for a delay in the activation time $T_w$ in the order of 30 μs to arise, for example in order to activate the local transmitter. It is then necessary for a transmission frame to wait, and the transmission frame is delayed by this time.

SUMMARY OF THE INVENTION

It is an object of the present invention to achieve an improvement in the transmission speed in an Ethernet AVB transport protocol while simultaneously implementing a power saving mode.

The invention achieves this object for a method of the type mentioned at the outset by making particular provision for a reservation message and the setting of transmission rate and/or data rate to be taken as a basis for activating the local transmitters and/or receivers of the nodes, preferably along the transmission link for the data, before the data are input into the transmission frame (MAC frame) and transmitted to the local transmitter, i.e., transferred to the physical layer.

In this context, the invention utilizes the fact that the sending of data in accordance with the Ethernet AVB transport protocol requires prior reservation of the physical transmission channel, with the traffic shapers of the output ports also being set, i.e., the data rate and/or transmission rate thereof. Hence, the cycle time for the data to be sent is known to the local transmitters and receivers in the Ethernet network along the transmission link between the initial transmitter and the destination receiver. If the aim is thus for a data packet to be transmitted, the local transmitter and/or receiver can actually be fetched from the energy saving mode (LPI) before the data packet is really pending transmission and is put into the transmission frame (MAC frame), since the scheduled instance of transmission is known from the reservation. Provided that this takes place by at least the activation time $T_w$ earlier than the data are put into the transmission frame, it is possible to implement transmission without any time delay.

The method according to an aspect of the invention thus allows the delay caused by the activation time to be decreased in an AVB Ethernet transport protocol or in the best case avoided, as a result of which the requested and reserved quality of service (latency, jitter) for the data to be transmitted can be observed.

According to a particularly preferred embodiment of the proposed method, the local transmitter and/or receiver of a node can be activated by writing to a suitable MAC or PHY register, as a result of which it is suggested to the MAC protocol layer or to the physical layer (PHY layer) that data are pending transmission. The effect of this is that possibly deactivated local transmitters and/or receivers (PHY devices) are woken from a deactivated mode (LPI, energy saving mode) or activated. This method allows a particularly direct influence on the state signal that puts the local transmitter and/or receiver into the LPI mode (energy saving mode) or wakes it therefrom again, i.e., activates it.

As an alternative or in addition, the local transmitter and/or receiver of a node can be activated by a timer that prescribes the time when a local transmitter and/or receiver is activated again following the beginning of deactivation. When the timer has expired, the local transmitter or receiver leaves the LPI mode (energy saving mode) again automatically. Since the scheduled transmission time is known from the reservation message, the timer can be set, or can automatically set itself, such that it expires precisely at the activation time $T_w$ before the scheduled transmission instant, as a result of which the local transmitter and/or receiver are ready for transmission of the data at the transmission instant.

In a further possible embodiment of the method proposed according to the invention, which can be implemented as an alternative or in addition to the aforementioned embodiments, provision may be made for the local transmitter and/or receiver of a node to be activated by a dummy data packet that is transmitted prior to the transmission of the data, wherein the transmission of the dummy data packet may possibly be limited to the data of the dummy data packet being put into a transmission frame (MAC frame) in order to wake the local transmitter and/or receiver from the energy saving mode (LPI mode).

In each of the cases described above, it is particularly useful for the local transmitter and/or receiver of a node to be activated prior to a scheduled transmission instant, which is known from the reservation message and/or the setting of the transmission rate and/or data rate, by at least the activation time $T_w$ in order to avoid a time delay for the transmission as completely as possible.

For the activation of the local transmitter and/or receiver by a dummy data packet, it may be particularly advantageous for the local transmitter and/or receiver to be activated prior to the scheduled transmission instant that is known from the reservation message and the setting of the transmission rate and/or the data rate by at least the sum of the activation time $T_w$ and the transmission period for the dummy data packet in order to avoid a delay for the data transmission.

In addition, in a further development of the proposed method, provision may be made for the dummy data packet to be produced by an application, particularly from a higher layer than the layer upstream of the physical layer, i.e., the MAC layer, and to be transmitted to the layer upstream of the physical layer, i.e., the MAC layer, in which the dummy data packet is inserted into a transmission frame. This then results immediately in activation of the local transmitter and/or receiver in the physical layer. As a result, it is possible, without intervention in the physical operation of the data transmission, to steer such a dummy data packet through upstream application layers, which may be prescribed without restriction by the manufacturer of the nodes or controllers, without the need to alter standards for the actual data transmission.

In order to avoid additional data traffic in the communication network in the event of use of dummy data packets for activating the local transmitters and/or receivers, and so as not to bring about any line loading, which for its part expends energy, the invention may provide for the dummy data packet to be rejected in the local transmitter and/or receiver and not to be transmitted to another node, i.e., not to be put onto the network for transmission. To this end, the dummy data packet may contain special coding that results in the data packet being rejected in the local transmitter and/or receiver following activation thereof without the data packet being transmitted by a PHY device, for example a transceiver as a local transmitter and/or receiver.

The local transmitters and/or receivers are usually what are known as transceiver devices, which are transmitters and receivers simultaneously, which means that a receiver can also be activated by virtue of a data packet being transmitted to the supposed data receiver, which data packet can then be rejected, in particular, prior to transmission but results in activation of the transceiver from an energy saving mode (LPI mode).

In order to be able to perform the transmission of the reservation messages regardless of possible activation and/or deactivation of the local transmitters or receivers, according to an aspect of the invention, the data may be transmitted in the Ethernet-based network and reservation messages may be transmitted on different transmission channels.

According to another aspect of the invention a controller has a local transmitter and/or receiver and a computation unit, wherein the computation unit is set up by program code for transmitting data using an Ethernet AVB transport protocol between nodes, particularly controllers, of a motor vehicle. According to the invention, the computation unit is set up by program code so as to carry out the previously described method or portions thereof.

Correspondingly, an aspect of the invention also relates to a computer program having program code, stored in a non-transitory computer-readable medium, that is suited to setting up the computation unit to carrying out the previously described method or portions thereof when the program code is executed on a computation unit.

BRIEF DESCRIPTION OF THE DRAWINGS

Further advantages, features and opportunities for application of the present invention will emerge from the description below of exemplary embodiments and from the drawings. In this case, all the described and/or graphically presented features independently or in any combination form the subject matter of the present invention, even regardless of their combination in the claims or the back-references therein. In the drawings:

DETAILED DESCRIPTION OF THE PRESENTLY PREFERRED EMBODIMENTS

Figure 1:
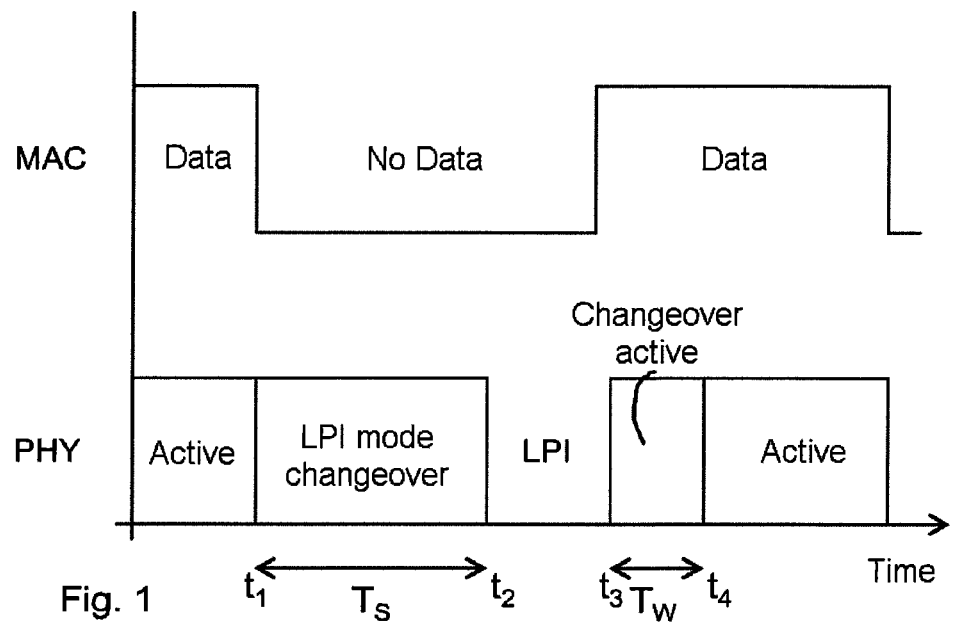
FIG. 1 shows the normal flow of an Ethernet AVB transport protocol using the energy efficient Ethernet in a first implementation.

FIG. 1 shows the normal interval of time between the state changes between the energy saving mode (LPI) and the normal state (active) of the local transmitters and receivers (PHY devices) in the physical layer (PHY) and the associated timing of the transmission frames (MAC frame) in the MAC layer.

While data for transmission are put into the transmission frame in the MAC layer, this being represented by a high state in the MAC layer with the identification "data", i.e., an active transmission frame (MAC frame), data have thus been put into the transmission frame (MAC frame) in this state. So long as there are data in the transmission frame, the transmitter (PHY) of the physical layer is active.

At the instant $t_1$, the data pending in the MAC layer have been transmitted completely, and up to the instant $t_3$ no further data are pending transmission. Within the context of the energy efficient Ethernet, the Ethernet transceiver (PHY)—in the case of the sending node that is to say with its transmission function—changes over to an energy saving mode (LPI mode, Low Power Idle). For this, the IEEE 802.3az standard provides it with a deactivation time $T_s$ of 200 µs, so that the Ethernet transceiver PHY reaches the energy saving mode, in which the Ethernet transceiver PHY is deactivated, at the instant $t_2$.

Subsequently, the Ethernet transceiver PHY is in its quiescent mode (LPI) until, at the instant $t_3$, new data are put into a transmission frame (MAC frame) in the MAC layer. At this instant, the Ethernet transceiver (PHY, transceiver) begins changeover to the active normal state, which, according to the IEEE 802.3az standard for the energy efficient Ethernet, has been reached after an activation time $T_w$ of 30 µs at the instant $t_4$. Subsequently, the data that are pending in the MAC layer and that have been put into the transmission frame (MAC frame) are transmitted by the active Ethernet transceiver (PHY). The data pending transmission in the MAC layer must thus wait in the transmission frame for the activation time $T_w$ until transmission takes place. This results in a delay in the transmission of 30 µs.

FIG. 1 shows the state according to the existing IEEE 802.3az standard for the energy efficient Ethernet (EEE).

Figure 2:
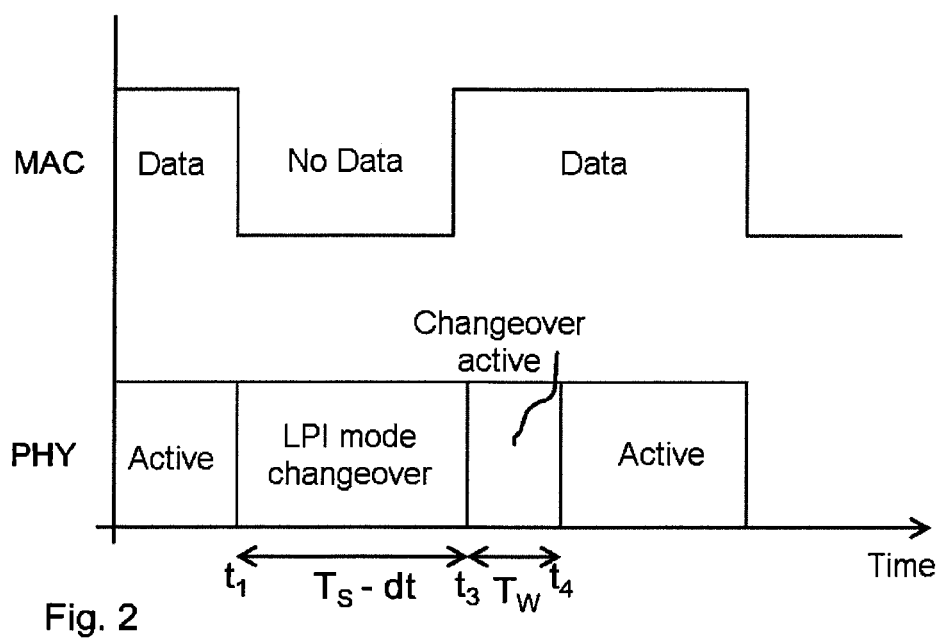
FIG. 2 shows the normal flow of an Ethernet AVB transport protocol using the energy efficient Ethernet in a second implementation.

FIG. 2 shows a similar change of state according to the IEEE 802.3az standard for the energy efficient Ethernet, in which an Ethernet transceiver (PHY) in the physical layer changes from an active normal state to an energy saving mode (deactivated state), which is called the LPI state. In this case too, the Ethernet transceiver PHY begins to change over to the energy saving mode following completed transmission of the data in the transmission frame of the MAC layer at the instant $t_1$. Before the energy saving mode is reached after the deactivation time $T_s$, however, data are again pending transmission in the MAC layer, so that they are put into a transmission frame (MAC frame). The changeover to the energy saving mode (LPI mode) is therefore terminated at the instant $T_s$-dt and the activation process for the Ethernet transceiver PHY is begun again at the instant $t_3$ when data are put into the transmission frame of the MAC layer.

Regardless of whether the energy saving mode (deactivated state) of the Ethernet transceiver PHY had actually been achieved, the activation time $T_w$ is needed in order to begin transmission of the data pending in the transmission frame of the MAC layer in an active normal state of the Ethernet transceiver (PHY). In the cycle shown in FIG. 2, there is thus no power saving at all, since the energy saving mode of the Ethernet transceiver PHY is not reached. Nevertheless, the transmission of the data entails the delay by the activation time $T_w$, which is 30 µs according to the IEEE 802.3az standard.

This is now the starting point of the method according to the present invention, which is explained with reference to FIG. 3.

The proposed method utilizes the fact that the cycle times of the data streams to be transmitted are known to the respective network nodes as a result of the reservation according to the Ethernet AVB protocol. Therefore, the node knows the respective scheduled transmission instant $t_{tx}$ at which the next data packet in the MAC layer is meant to be put into the transmission frame (MAC frame). At this instant, a packet of the data stream is thus intended to be sent via the Ethernet transceiver (PHY) in the data network. In that case, even if there are actually no useful data pending transmission in the MAC layer at this instant, the Ethernet transceiver (PHY) is woken from the quiescent state or energy saving mode (LPI), or activated, as early as the instant $t_{tx}$-$T_w$, which means that the activation time $T_w$ occurs before the scheduled transmission instant $t_{tx}$. The activation of the Ethernet transceiver (PHY) is thus brought forward by the activation time $T_w$, as a result of which the data packet can, when put into the transmission frame (MAC frame) of the MAC layer, immediately be transmitted by the active Ethernet transceiver PHY in the active normal state without delay.

The activation of the Ethernet transceiver (PHY) at the instant $t_{tx}$-$T_w$ can be accomplished by writing to a suitable MAC or PHY register, for example, which controls the activation and deactivation of the Ethernet transceiver (PHY) in the physical layer (PHY layer) of the Ethernet transport protocol. This thus involves direct access to the state signal that puts the Ethernet transceiver (PHY) into the energy saving mode (LPI mode) or wakes it therefrom again.

Following transmission of the data to the transmission frame of the MAC layer, the Ethernet transceiver (PHY) then changes over to the energy saving mode (LPI mode) again during the deactivation time $T_s$ until the next scheduled data packet is pending transmission, the activation again being brought forward by the activation time $T_w$ in this case too.

Figure 3:
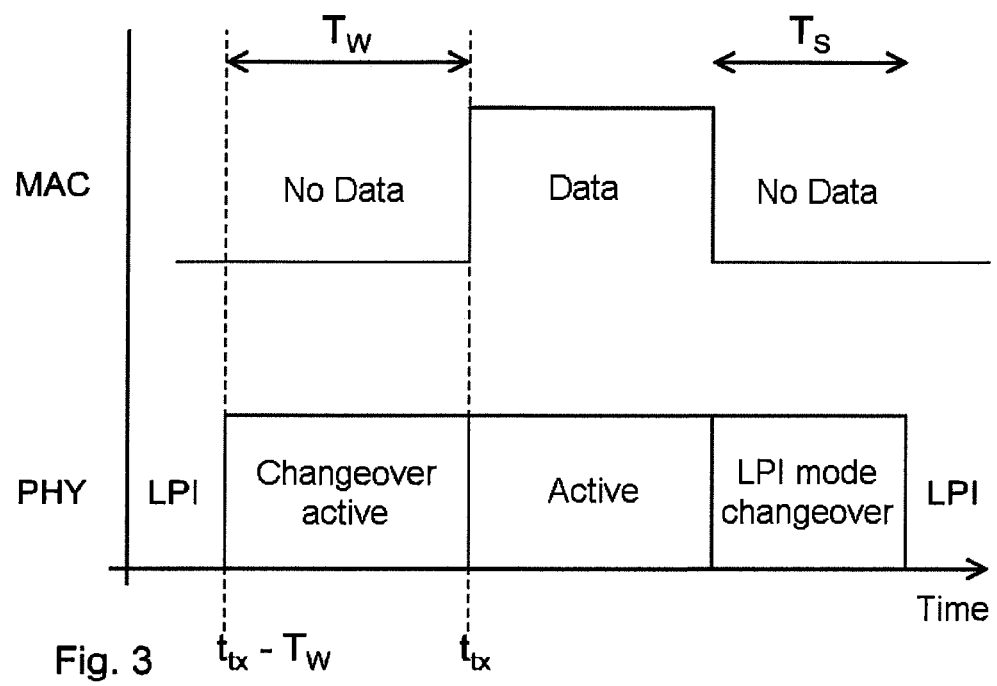
FIG. 3 shows the flow of an Ethernet AVB transport protocol according to the invention in an energy efficient Ethernet with early activation of the local transmitters and/or receivers in accordance with an embodiment.

This flow shown in FIG. 3 thus ensures that, even when an energy efficient Ethernet is used, no additional delay and no jitter occur during the transmission of the data stream by the activation time $T_w$ in the case of the data transmission within the context of the Ethernet AVB transport protocol according to the IEEE 1722 standard.

Another or an additional embodiment of the proposed method involves a timer being operated in the node, which timer stipulates the time for which the Ethernet transceiver (PHY) is in the energy saving mode (LPI state). When the time set in the timer has elapsed, the Ethernet transceiver automatically leaves the energy saving mode again, so that at the scheduled transmission instant $t_{tx}$ the Ethernet transceiver is in an active normal state and can transmit the data immediately when they are put into the transmission frame of the MAC layer. For a known transmission instant $t_{tx}$, the timer can thus be set such that it expires at the instant $t_{tx}$-$T_w$ and the Ethernet transceiver is therefore ready to transmit data at the scheduled transmission instant $t_{tx}$.

A further option for activating the Ethernet transceiver from the energy saving mode (LPI) involves activating the Ethernet transceiver (PHY) by putting a dummy data packet into the transmission frame (MAC frame) of the MAC layer in good time prior to the scheduled transmission times $t_{tx}$. Preferably, this takes place at the instant t $t_{tx}$-$t_{DUMMY}$-$T_w$, the time $t_{DUMMY}$ being the transmission period for the dummy packet.

This dummy data packet is used merely to activate the Ethernet transceiver (PHY) from the energy saving mode (LPI mode) in good time without this involving the need for changes on the energy efficient Ethernet mechanism. These dummy packets can be produced before an application in a protocol layer upstream of the MAC layer, and can be adjusted as appropriate by the manufacturers or users of the Ethernet protocol using suitable applications. Therefore, the invention provides an application that generates suitable dummy data packets and transfers them to the MAC layer, which then puts these dummy data, without there being any actual data (useful data) present, into a transmission frame, the direct result of which is that the Ethernet transceiver (PHY) is activated from a quiescent state in the energy saving mode (LPI). The content of the data packet is irrelevant in this case and is preferably chosen such that no reactions are triggered for the party receiving the transmitted data packet.

According to a particularly preferred option for generating a dummy data packet, provision may also be made for the definition of the dummy data packet to result in these data being rejected in the Ethernet transceiver (PHY), i.e., in the physical layer, again prior to transmission, without the occurrence of a data transmission that encumbers the network. This could be effected as part of an adjustment of the present standard, for example.

Overall, the proposed method thus proposes an efficient option for saving energy in relation to transmission and reception energy at nodes without the energy saving resulting in a time delay for the transmission and in jitter, i.e., a time delay, for the data transmission.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data using an Ethernet AVB transport protocol between nodes of a motor vehicle, in which data are transmitted at cyclic intervals via an Ethernet-based network by inputting the data into a transmission frame (MAC frame) and forwarding to local transmitters (PHY) and in which, prior to the data being sent, the resources that are necessary for the transmission of the data are reserved by reservation messages from a dedicated protocol, wherein the flow of data from a node is set to a particular transmission rate and/or data rate, and in which the local transmitters and receivers (PHY) of a node are deactivated in non-use periods, in which no data need to be transmitted, and are activated again provided that data are pending transmission in a transmission frame (MAC frame), wherein the local transmitters and receivers (PHY) are available for transmission following an activation time (Tw), wherein:

the local transmitters and/or receivers of the nodes are activated on the basis of a reservation message and setting of the transmission rate and/or data rate;

the local transmitter and/or receiver (PHY) of a node is/are activated by a dummy data packet that is transmitted prior to the transmission of the data, by putting said dummy data packet into the transmission frame (MAC frame) of the MAC layer prior to the scheduled transmission times; and the dummy data packet contains a coding that results in the data packet being rejected in the local transmitter and/or receiver following activation thereof without said data packet being transmitted by a PHY device.

2. The method as claimed in claim 1, wherein the local transmitter and/or receiver (PHY) of a node is/are activated prior to a scheduled transmission time by at least the activation time (Tw).

3. The method as claimed in claim 1, wherein the local transmitter and/or receiver (PHY) of a node is/are activated prior to a scheduled transmission time by at least the sum of the activation time (Tw) and the transmission period for the dummy data packet.

4. The method as claimed in claim 1, wherein the dummy data packet is produced by an application and transferred to an upstream layer.

5. The method as claimed in claim 1, wherein the data are transmitted in the Ethernet-based network and reservation messages are transmitted on different transmission channels.

6. A controller having a local transmitter and/or receiver and a computation unit, wherein the computation unit is configured to execute program code for transmitting data using an Ethernet AVB transport protocol between nodes of a motor vehicle, wherein the program code causes the computation unit to carry out the method as claimed in claim 1.

7. A non-transitory computer-readable medium storing program code that, when executed by a computation unit, causes the computation unit to carry out the method as claimed in claim 1.

* * * * *